United States Patent [19]
Varis et al.

[11] 3,984,080
[45] Oct. 5, 1976

[54] VACUUM SEWER VALVE

[75] Inventors: Martti Varis, Leppavaara; Krister Nordberg, Helsinki, both of Finland

[73] Assignee: Oy Wartsila AB, Helsinki, Finland

[22] Filed: Nov. 7, 1974

[21] Appl. No.: 521,895

[30] Foreign Application Priority Data
Nov. 12, 1973 Finland .............................. 3474/73

[52] U.S. Cl. .................................... 251/5; 251/7
[51] Int. Cl.² ...................... F16K 7/07; F16K 7/06
[58] Field of Search ............................ 251/5, 7, 61.1

[56] References Cited
UNITED STATES PATENTS

| 453,628 | 6/1891 | Durand | 251/6 X |
|---|---|---|---|
| 2,026,916 | 1/1936 | Smith | 251/5 X |
| 2,467,150 | 4/1949 | Nordell | 251/5 X |
| 2,633,154 | 3/1953 | Eastman | 251/5 |
| 3,364,946 | 1/1968 | Svensson | 251/61.1 X |
| 3,469,582 | 9/1969 | Jackson | 251/5 X |
| 3,482,267 | 12/1969 | Liljendahl | 251/5 X |

FOREIGN PATENTS OR APPLICATIONS 179,538   10/1905   Germany .............................. 251/5

*Primary Examiner*—Martin P. Schwadron
*Assistant Examiner*—Richard Gerard
*Attorney, Agent, or Firm*—Haseltine, Lake & Waters

[57] ABSTRACT

A valve suitable for connection to a vacuum sewer system and comprising a flow duct with a resilient wall which acts as a flow duct closing member. Outside the wall with respect to the flow duct there is a closed chamber connectable to suitable pressure sources in order to move the resilient wall by means of pressure between a flow duct closing and a flow duct opening position. In order to improve the closing movement of the valve the resilient wall is provided with a stiffener at the outlet side of the flow duct.

4 Claims, 1 Drawing Figure

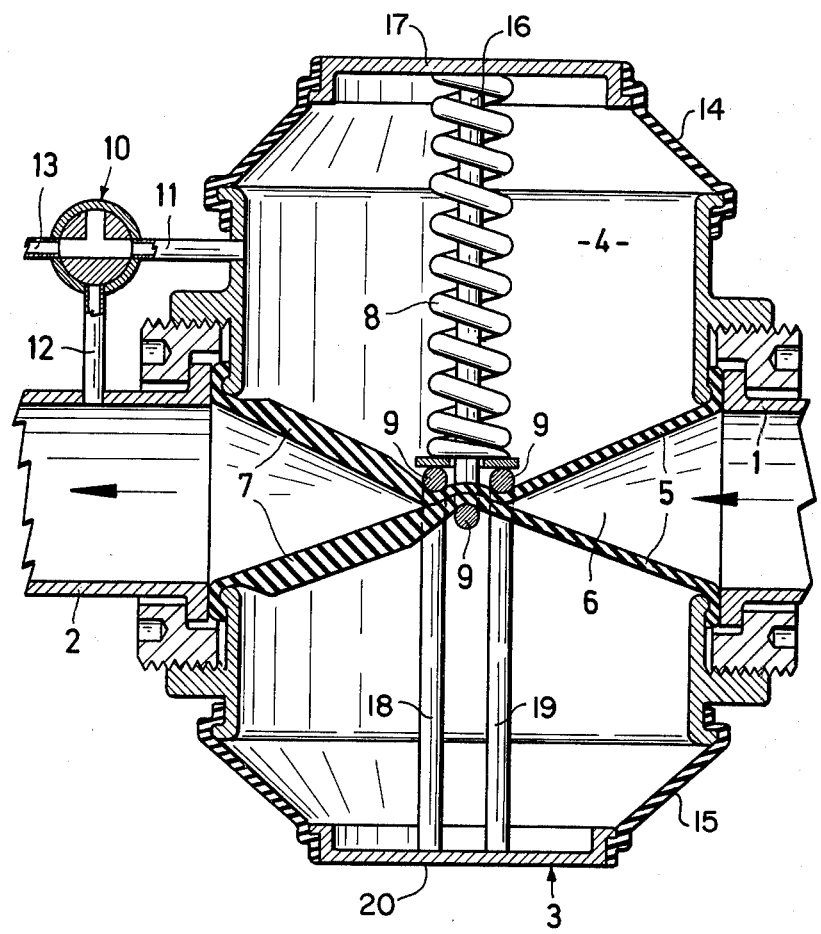

VACUUM SEWER VALVE

FIELD OF THE INVENTION

The invention relates to a valve suitable for connection to a vacuum sewer system, and more particularly to an outlet valve for a vacuum closet. The valve of the invention is of a type which comprises a resilient wall, acting as a closing member, and a closed chamber outside the wall. The chamber is connectable to a suitable pressure or vacuum source in order to move the resilient wall into a flow duct closing or opening position.

BACKGROUND OF THE INVENTION

German Pat. No. 179,358, German application specification (Offenlegungsschrift) No. 1,482,303 and Swedish Pat. No. 349,841 show a so called hose valve which is suitable for being used as an outlet valve for a vacuum closet and which comprises a resilient and flexible hose-like member surrounded by a control chamber, wherein over- or underpressure can be created in order to close or open the valve. Generally, the aim is to design such a valve so that it, when connected to a vacuum sewer, is automatically kept closed by the underpresure in the vacuum sewer. In this case, no overpressure is needed to close the valve. When the valve is to be opened, it is only necessary to connect the control chamber to the vacuum system of the sewer. However, this kind of valve has not proven to be reliable, as malfunction may occur and as the valve does not always close quite tightly. In vacuum sewer systems, it is of great importance that all connections to the vacuum sewer are completely tight when closed. Hence, the use of valves which are not quite reliable especially with respect to tight closing must be avoided.

SUMMARY OF THE INVENTION

An object of the invention is to provide a vacuum closet outlet valve with a very high operating reliablity in every respect, while keeping manufacturing cost to a reasonable level.

The invention is characterized in that a resilient wall of a valve is, on the suction side of the valve, provided with a stiffener in order to improve the closing movement of the valve. Such a simple step as providing the resilient wall with a stiffener has proved to improve the operating reliability of the valve substantially. The additional costs caused by the mentioned arrangement are quite insignificant, so that the invention gives a considerable improvement at low cost.

In a valve according to the invention, it is not necessary to make the whole tubular portion of the valve of resilient material. In principle, a portion of the wall of the flow duct may be rigid and another portion resilient, in which case the closing of the valve takes place as the resilient portion is pressed against the rigid portion. As it usually is easier to manufacture a valve in which the whole flow duct wall is made of resilient material, the invention is hereinafter described with reference to such an embodiment. However, it is evident that the invention may well be applied to a valve having a flow duct which is partly rigid.

If the flow duct wall is made completely of resilient material, the flow duct is, on the suction side of the valve, provided with preferably two diametrically located stiffeners. The advantage thus obtained is that the valve closing suction acts symmetrically on the resilient wall.

The valve closing movement can be made more effective by providing the valve with a loading member or members arranged to transmit a closing force to the stiffeners. The resilient wall itself can act as such a loading member if it has a certain prestress acting in closing direction. As a loading member, a spring can also be used, which can be built into the stiffeners or be located in their immediate vicinity. A third alternative is to use a spring member separate from the stiffeners.

In a valve according to the invention, the closing of the valve can further be secured by using a supporting member arranged to press against the resilient wall when the valve is closed. A suitable supporting member is a rod-like element mounted at right angles to the longitudinal axis of the flow duct of the valve. If the whole wall of the flow duct is made of resilient material, at least two supporting members are needed between which opposite portions of the resilient wall are pressed against each other. A still more secure closing is achieved if there are three supporting members arranged so that one member is located at one side of the flow duct and a pair of members at the other side of the duct, whereby the single member should be located between the pair of members when they meet as the valve is closed. The supporting members are preferably provided with spring loading means.

BRIEF DESCRIPTION OF THE DRAWING

In the following, the invention will be described greater in detail with reference to the attached drawing, the single FIGURE of which schematically shows, in longitudinal section, a valve according to the invention.

DETAILED DESCRIPTION

In the drawing, element 1 is an inlet pipe and element 2 an outlet pipe, both connected to the valve. The outlet pipe 2 forms a part of a vacuum sewer system and is always under vacuum. The body 3 of the valve comprises a control chamber 4 and a resilient cylindrical membrane wall 5 which surrounds the flow duct 6 of the the valve. The membrance 5 is provided with two stiffeners 7 on the suction side of the valve. In addition, the valve comprises a apring device 8 and three supporting members 9 to secure the closing of the valve.

The valve operates as follows: When the valve is to be opened, a connection between the outlet pipe 2 which is under vacuum and the control chamber 4 of the main valve 3 is opened through pipes 11 and 12 by means of a pilot valve 10. The pressure in the control chamber 4 now decreases and the atmospheric pressure in the inlet pipe 1 opens the valve. When the valve is to be closed, the pilot valve 10 is turned to the position shown in the drawing, thus connecting the control chamber 4 of the main valve through pipes 11 and 13 to the atmosphere. The valve now closes due to the vacuum in the outlet pipe, and the two stiffeners 7 and the supporting members 9 with their spring device 8 contribute to this.

An appears in the drawing the valve includes a top cone 14 and a bottom cone 15. These cones are made of a resilient material or a flexible material of the same kind as the tubular valve member 5. Consequently, when the valve 10 is operated to connect the closed chamber 4 to the pipe 2 the atmospheric pressure outside of the chamber 4 will act to compress the housing 3 in a vertical direction. This is due to the fact that the supporting member 9 is supported on a strut 16 connected to the top end member 17 connected with cone 14 and further due to the fact that the other pair of members 9 are respectively supported on struts 18 and 19 which are connected to the end 20 which is supported by the conical member 15.

The collapsing of the lower conical member 15 brings the members or upper horizontal bars 9 in an upward direction and the lower horizontal bar 9 supported on the strut 16 in a downward direction. Whereas normally the horizontal bars 9 have one pair on the upper side of the tubular member 5 in substantially straddling relationship to the horizontal bar 9 on the lower side of tubular member, the collapsing aforesaid operates to bring the bars apart with the upper pair of members moving upwardly and the lower member 9 moving downwardly whereby the valve memer 5 opens. The movements of the elements 9 take place against the loading of the spring 8 and as atmospheric pressure is again built up in the chamber 4 due to a subsequent operation of valve 10 the spring 8 will bring the different parts back to the illustrated position. This will operate to close the tubular member 5 as a consequence of which the valve is again closed.

The invention is not limited to the embodiment shown, but several variations are feasible within the scope of the following claims.

I claim:

1. A valve adapted for connection to a vacuum sewer system, said valve comprising a flow duct having an inlet side and an outlet side, a resilient wall in said flow duct, said wall acting as a flow duct closing member, means defining a closed expansible chamber, said resilient wall defining a portion of said chamber, pressure means, said chamber being connectable to said pressure meas to operate said wall by means of pressure between a flow duct closing and a flow duct opening position, stiffener means, said wall being, on the outlet side of said valve, coupled with said stiffener means in order to improve the closing movement of the valve, and mechanical loading means arranged to transmit to said stiffener means a force urging said wall towards its flow duct closing position.

2. A valve according to claim 1, in which said loading means comprises a spring device constituting a separate part from said stiffener.

3. A valve according to claim 1, comprising at least one separate supporting member and in which the closing of said flow duct is secured by means of said separate supporting member which is arranged to press against said resilient wall when the wall is in its flow duct closing position.

4. A valve according to claim 3, in which said resilient wall is tubular and there are a plurality of supporting members including three parallel members arranged outside said tubular wall with a pair of said members on one side of said wall and a third of said memberson the opposite side of said wall, said members being arranged to press said tubular wall into closing position between said pair of members and said third member, said third member being located to be straddled by the members of said pair when said tubular wall has been fully closed.

* * * * *